(12) United States Patent  
Hawkins et al.

(10) Patent No.: US 8,475,904 B2  
(45) Date of Patent: Jul. 2, 2013

(54) HOLLOW ARTICLE WITH COVERING

(75) Inventors: Stephen Hawkins, Ypsilanti, MI (US); Raj S. Roychoudhury, Bloomfield Hills, MI (US); David Flajnik, Rochester Hills, MI (US)

(73) Assignee: Salflex Polymers Limited, Weston, ON (CA)

( * ) Notice: Subject to any disclaimer, the term of this patent is extended or adjusted under 35 U.S.C. 154(b) by 0 days.

(21) Appl. No.: 13/288,044

(22) Filed: Nov. 3, 2011

(65) Prior Publication Data

US 2012/0114885 A1 May 10, 2012

Related U.S. Application Data

(60) Provisional application No. 61/410,610, filed on Nov. 5, 2010.

(51) Int. Cl.
*B32B 1/04* (2006.01)
*B32B 3/02* (2006.01)

(52) U.S. Cl.
USPC ........ 428/76; 296/37.3; 296/37.8; 296/37.14; 52/506.01; 52/506.02

(58) Field of Classification Search
USPC ..... 428/76; 296/37.3, 37.8, 37.14; 52/506.01, 52/506.05
See application file for complete search history.

(56) References Cited

U.S. PATENT DOCUMENTS

| | | | |
|---|---|---|---|
| 3,811,237 A | 5/1974 | Bettinger | |
| 6,136,259 A * | 10/2000 | Puffenberger et al. | ........ 264/515 |
| 2005/0028471 A1* | 2/2005 | Levesque et al. | .......... 52/506.01 |
| 2007/0196542 A1 | 8/2007 | Rathbone et al. | |
| 2008/0011761 A1 | 1/2008 | Gnepper et al. | |
| 2009/0223966 A1 | 9/2009 | Kidd et al. | |

OTHER PUBLICATIONS

International Search Report and Written Opinion, Int'l Appl. No. PCT/US11/59031, Date Mar. 16, 2012.

* cited by examiner

*Primary Examiner* — Michael C Miggins
(74) *Attorney, Agent, or Firm* — Medler Ferro PLLC

(57) ABSTRACT

A hollow article is provided having a first wall, a second wall and a plurality of edge walls interconnecting the first wall and second wall. A covering is bonded to the hollow article, wherein the covering is bonded to the first wall, and is dimensioned to partially wrap around the hollow article.

17 Claims, 15 Drawing Sheets

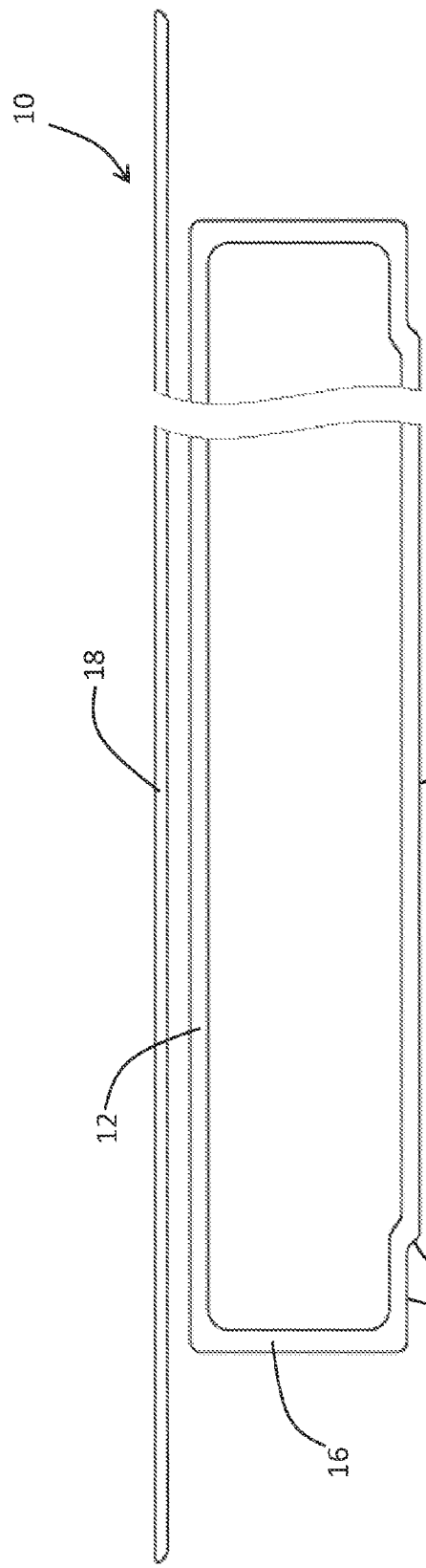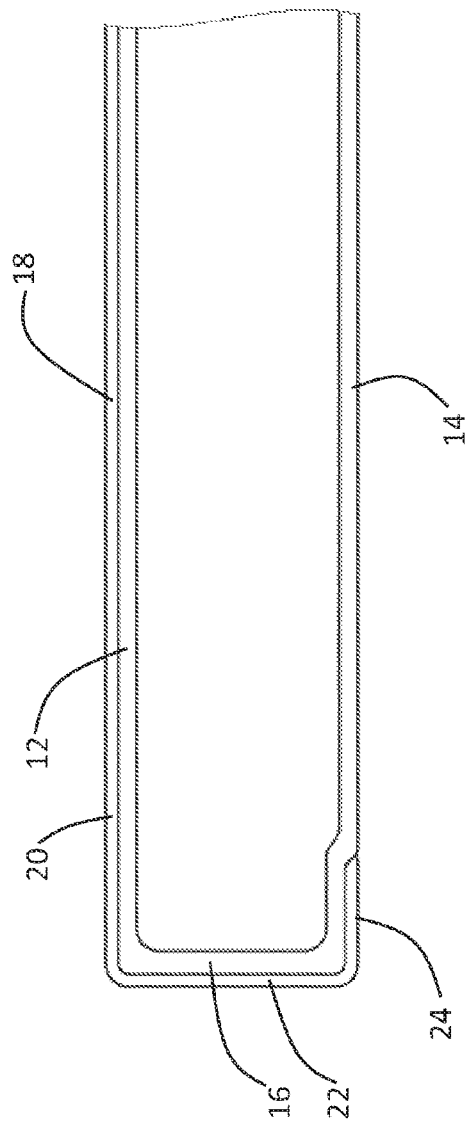

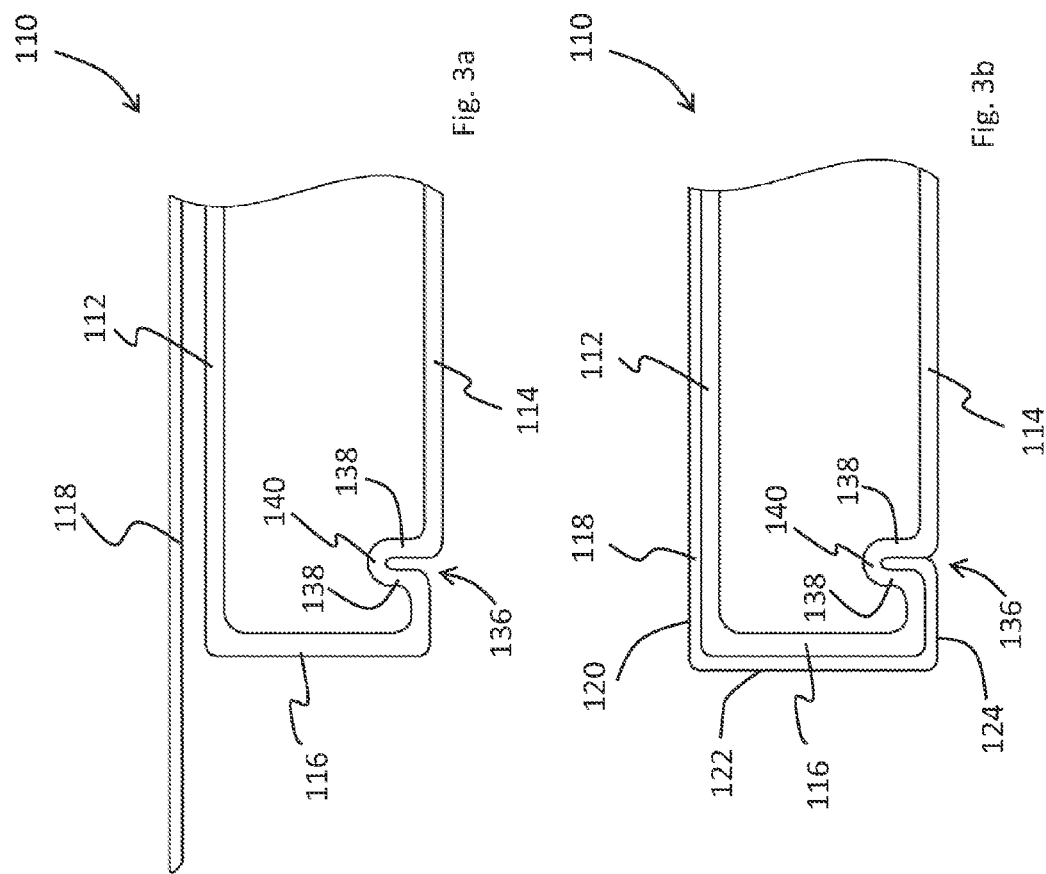

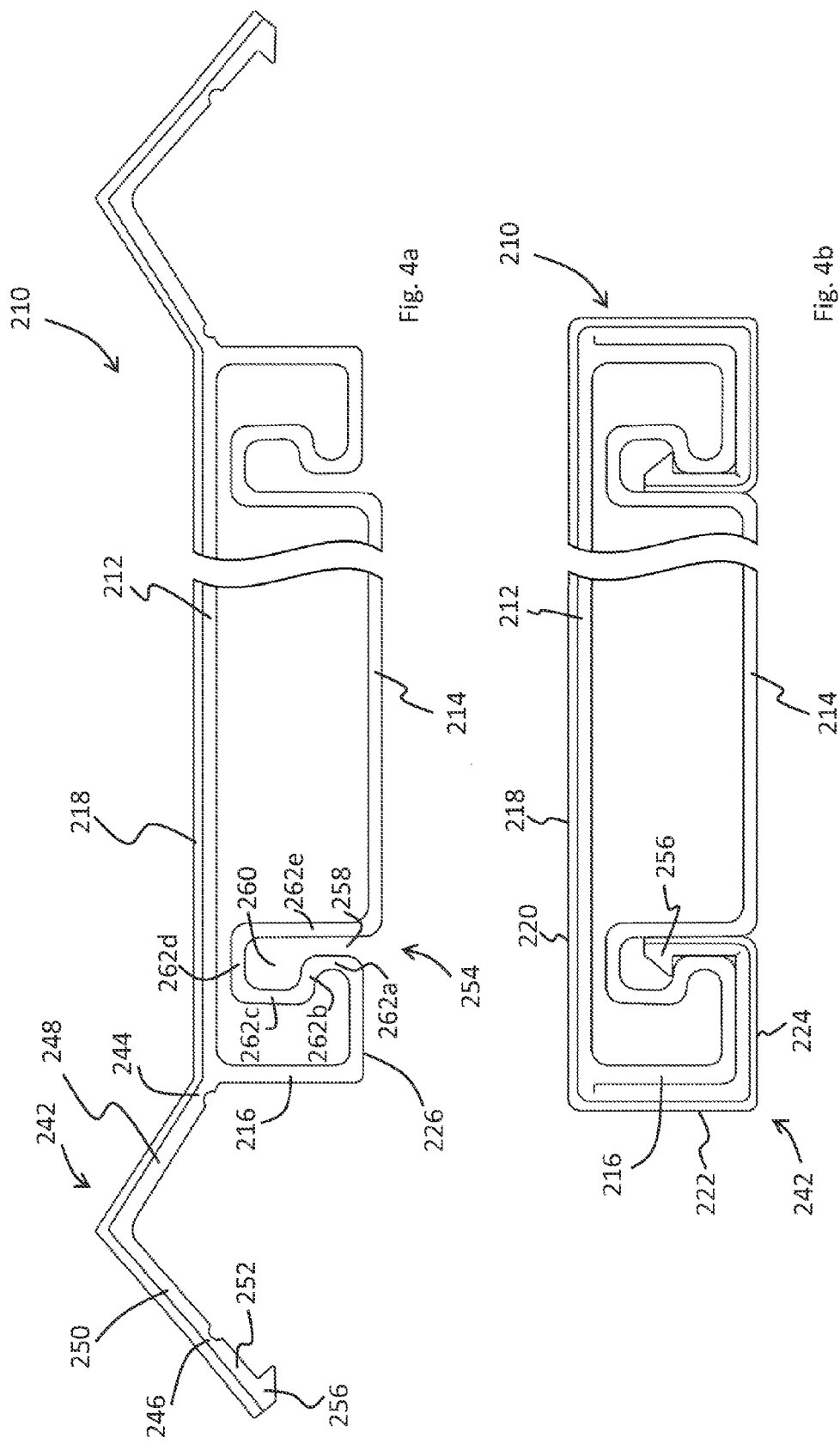

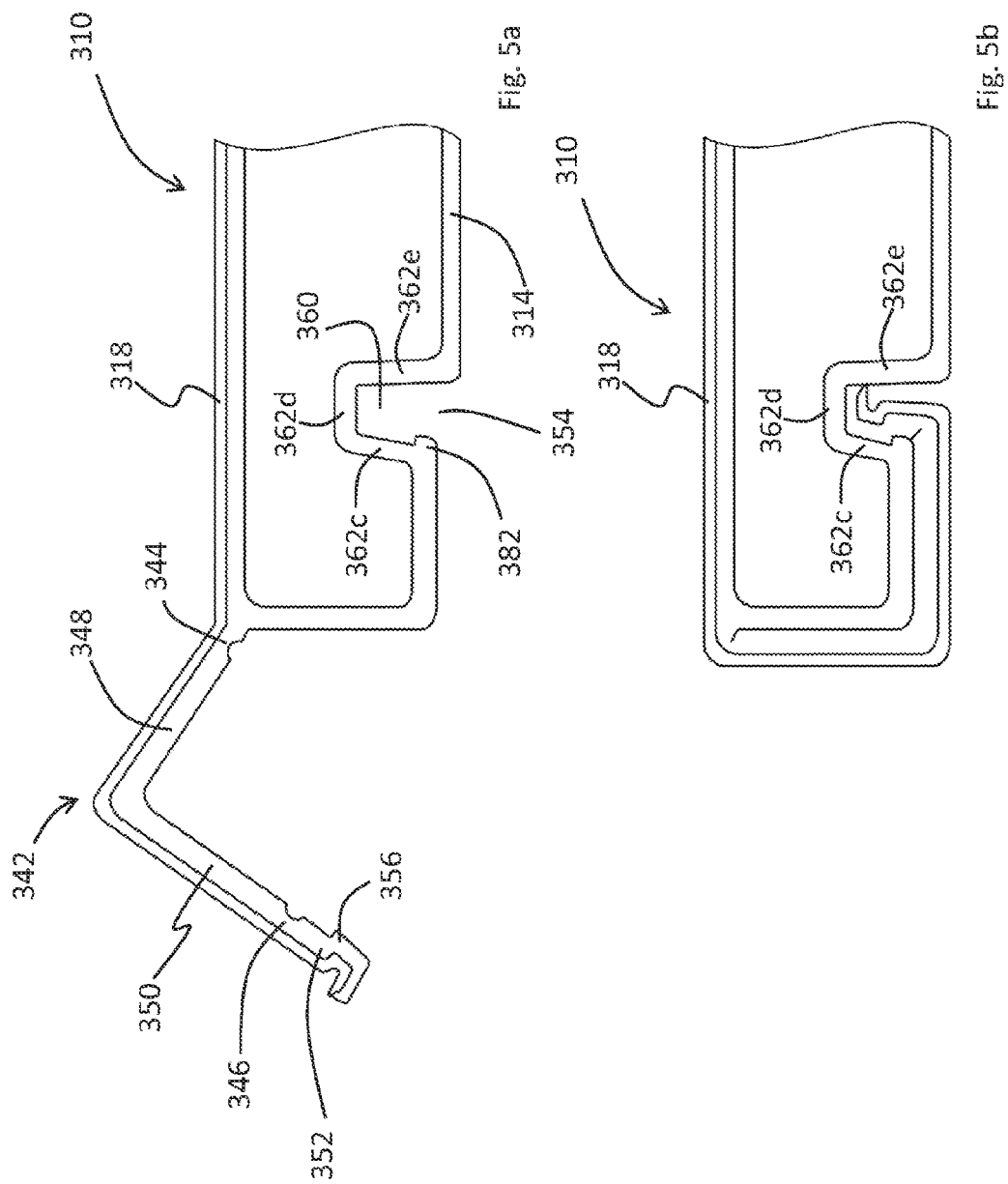

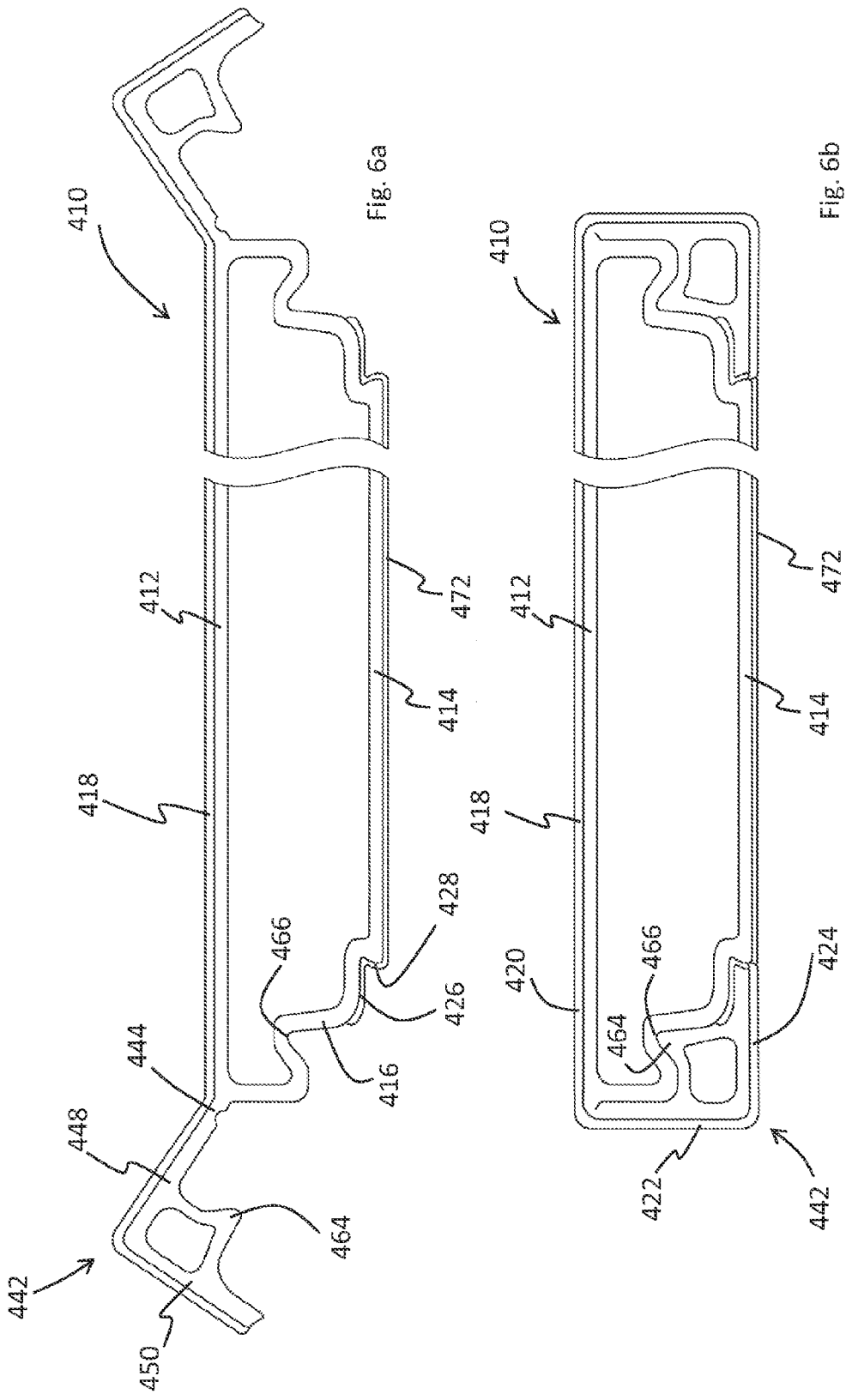

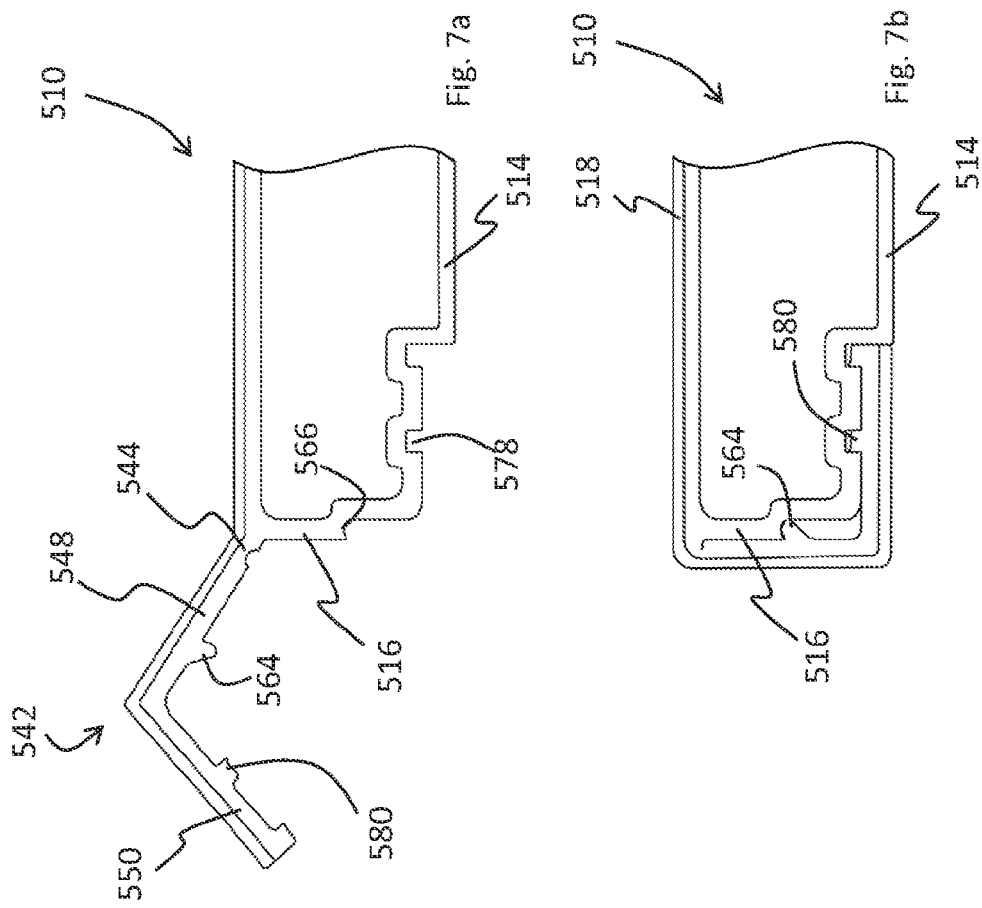

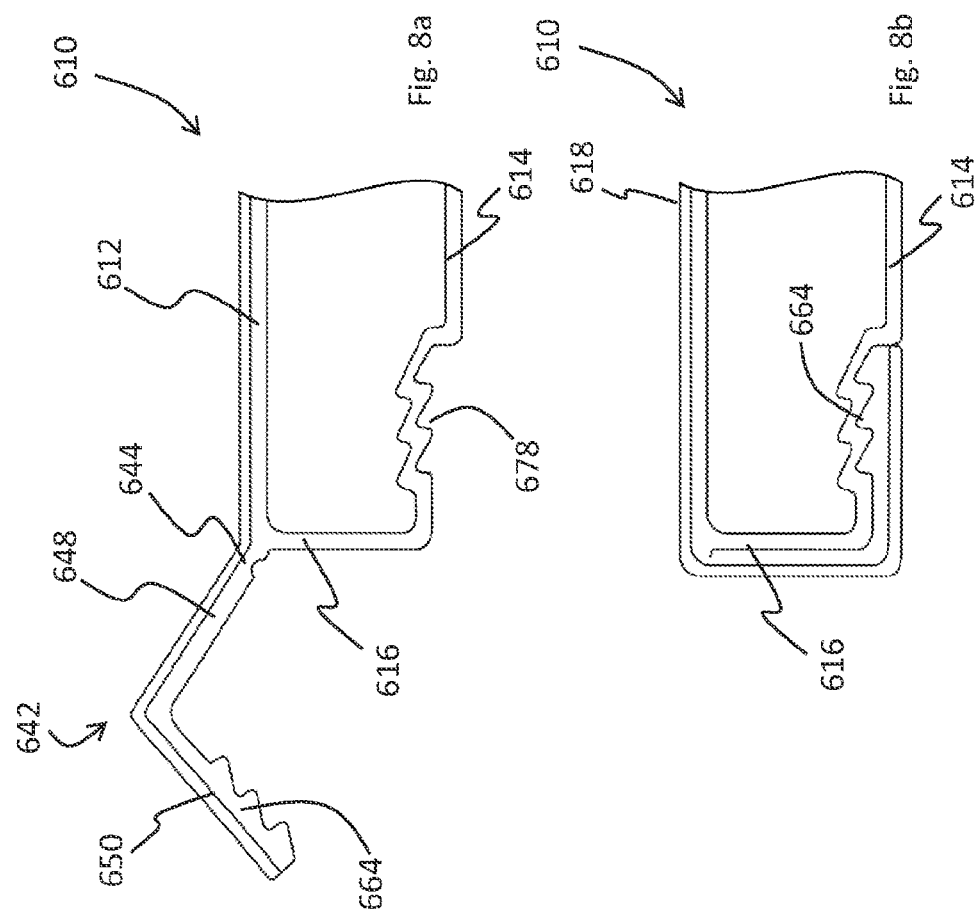

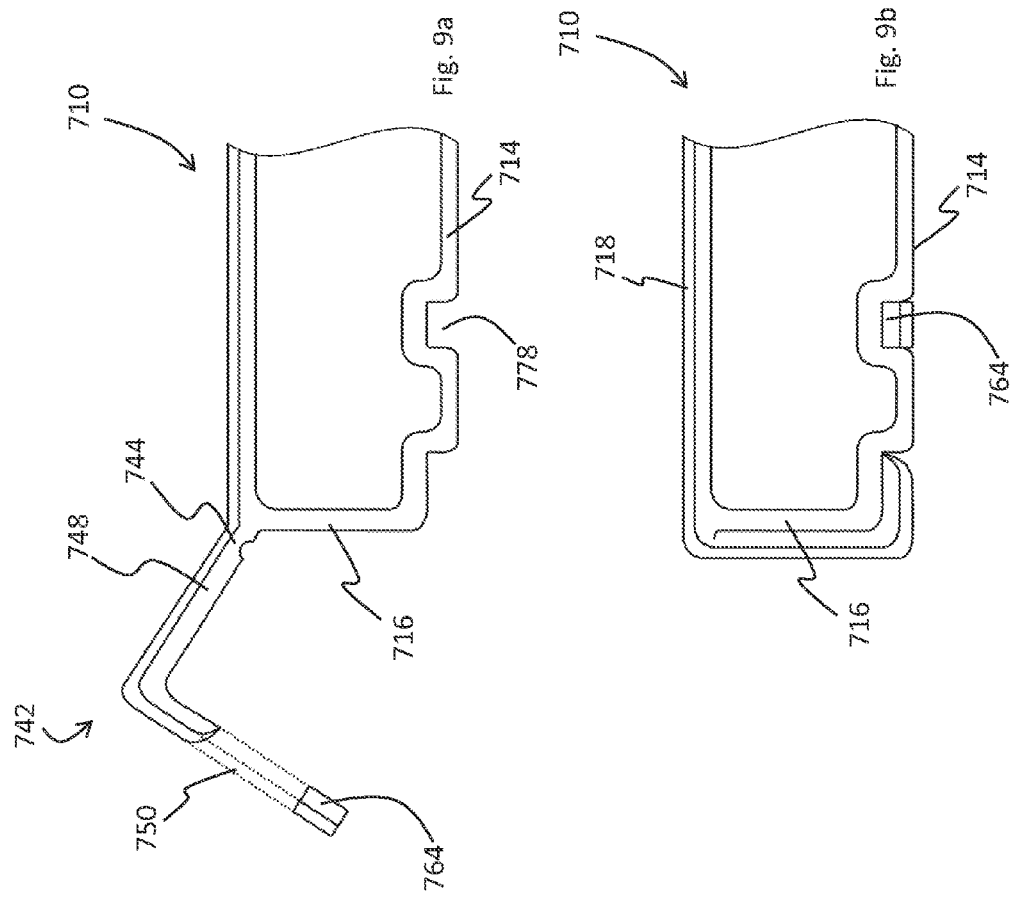

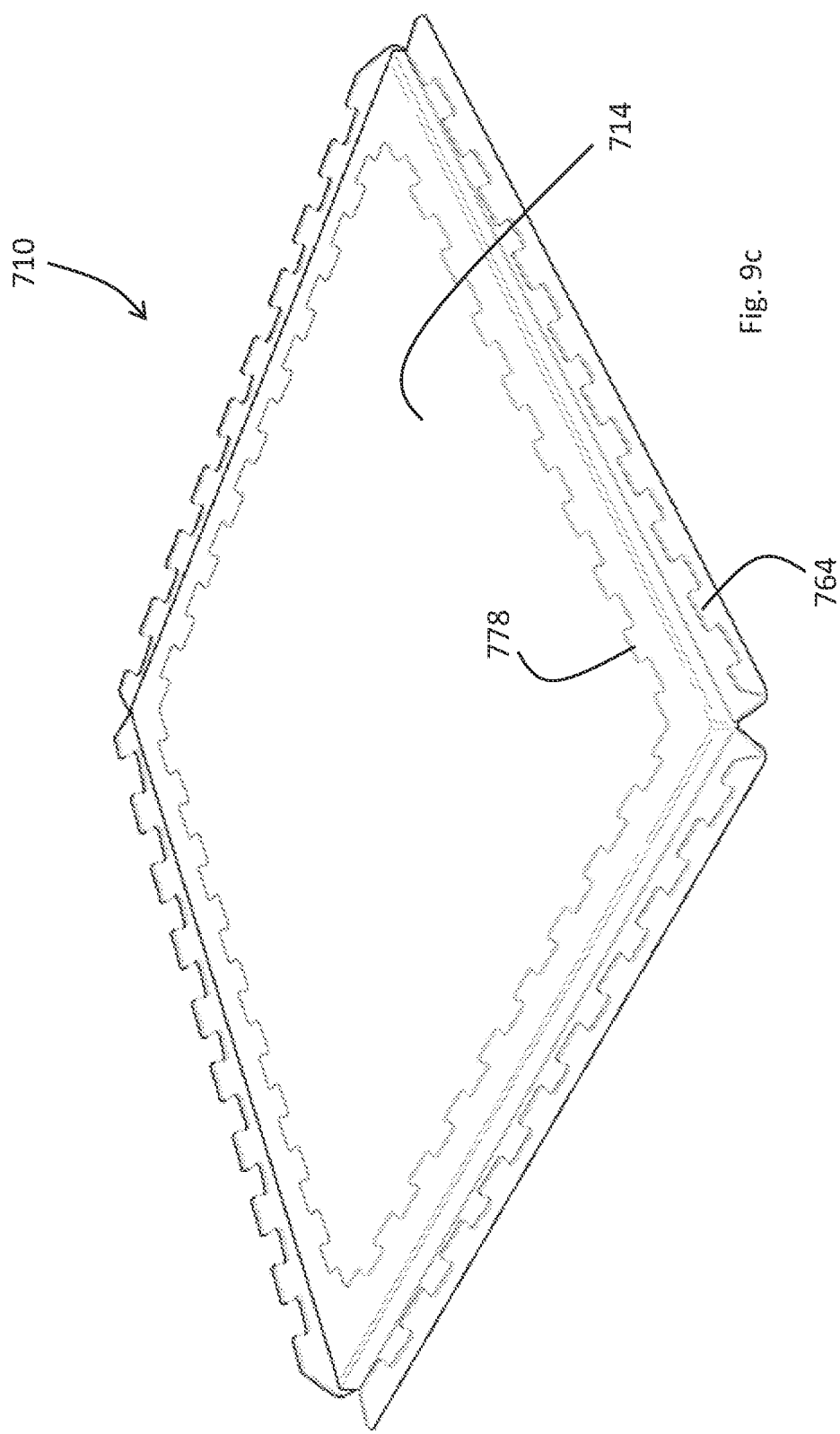

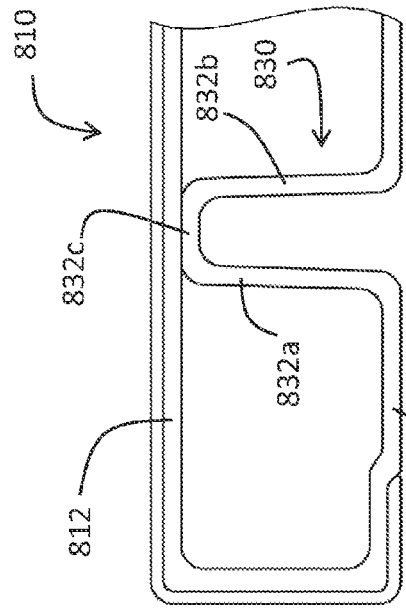
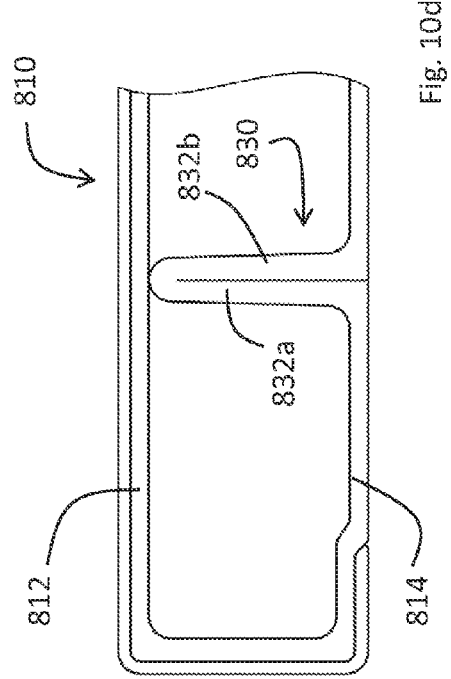
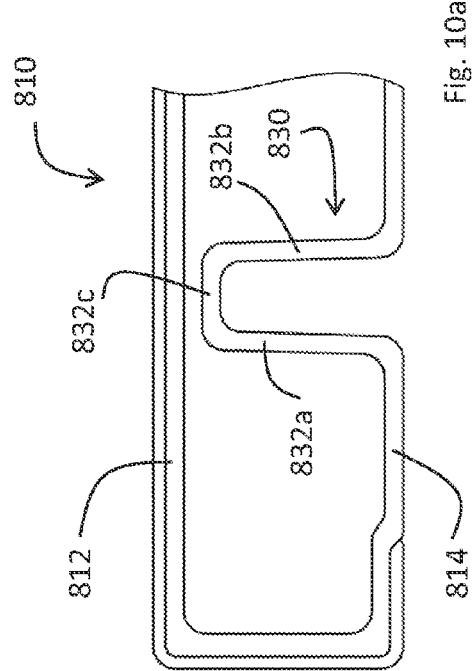
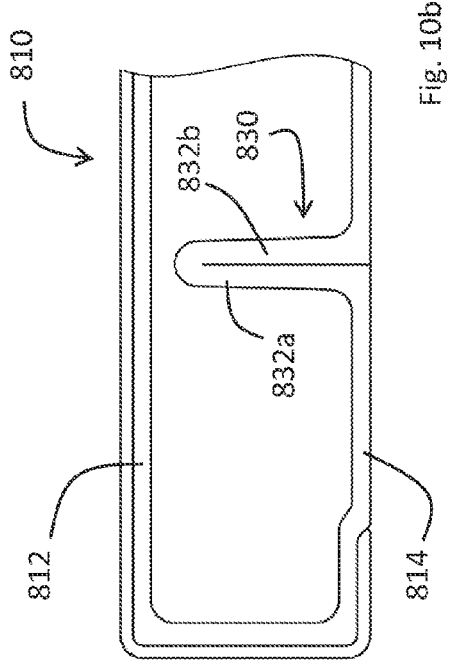

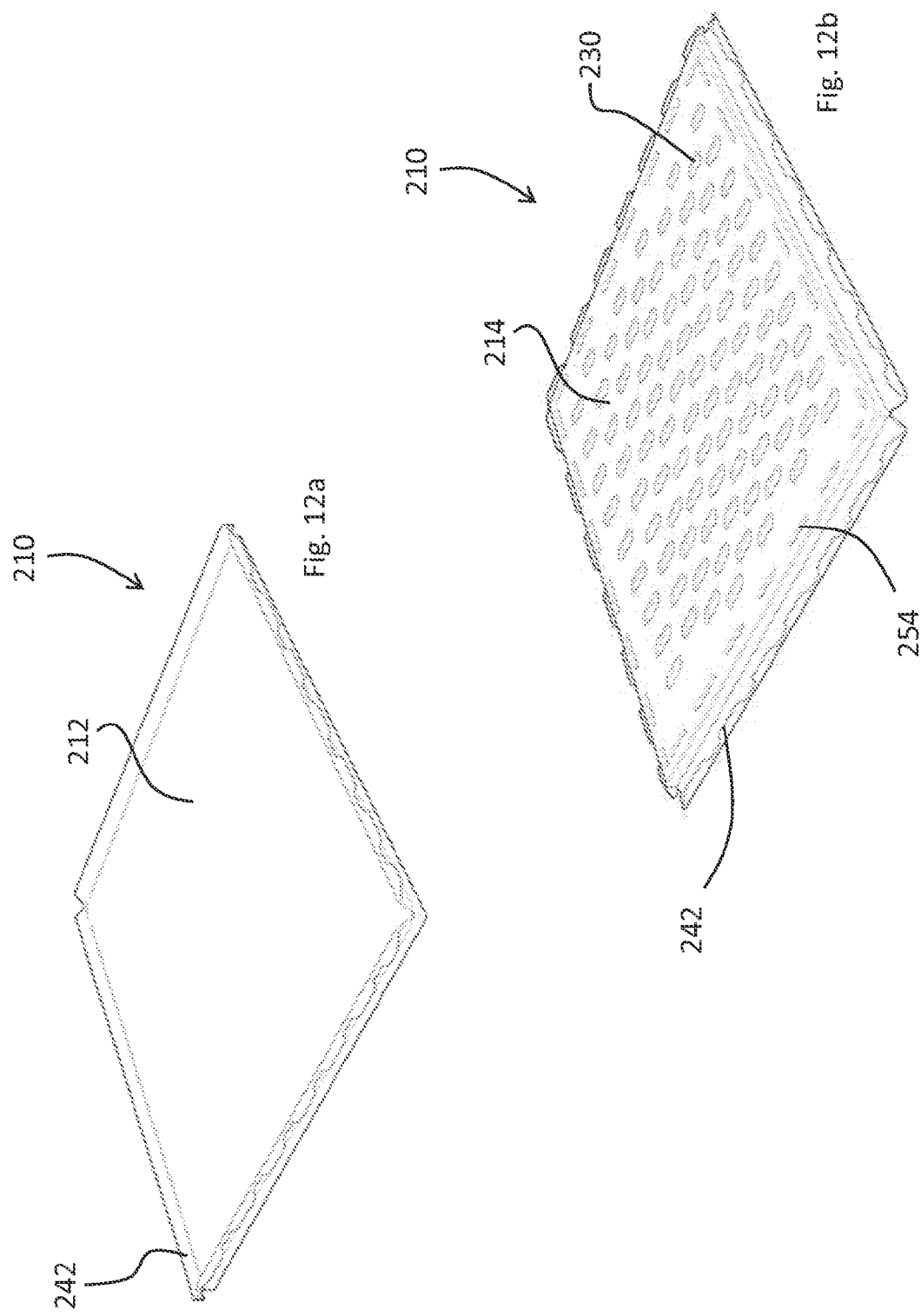

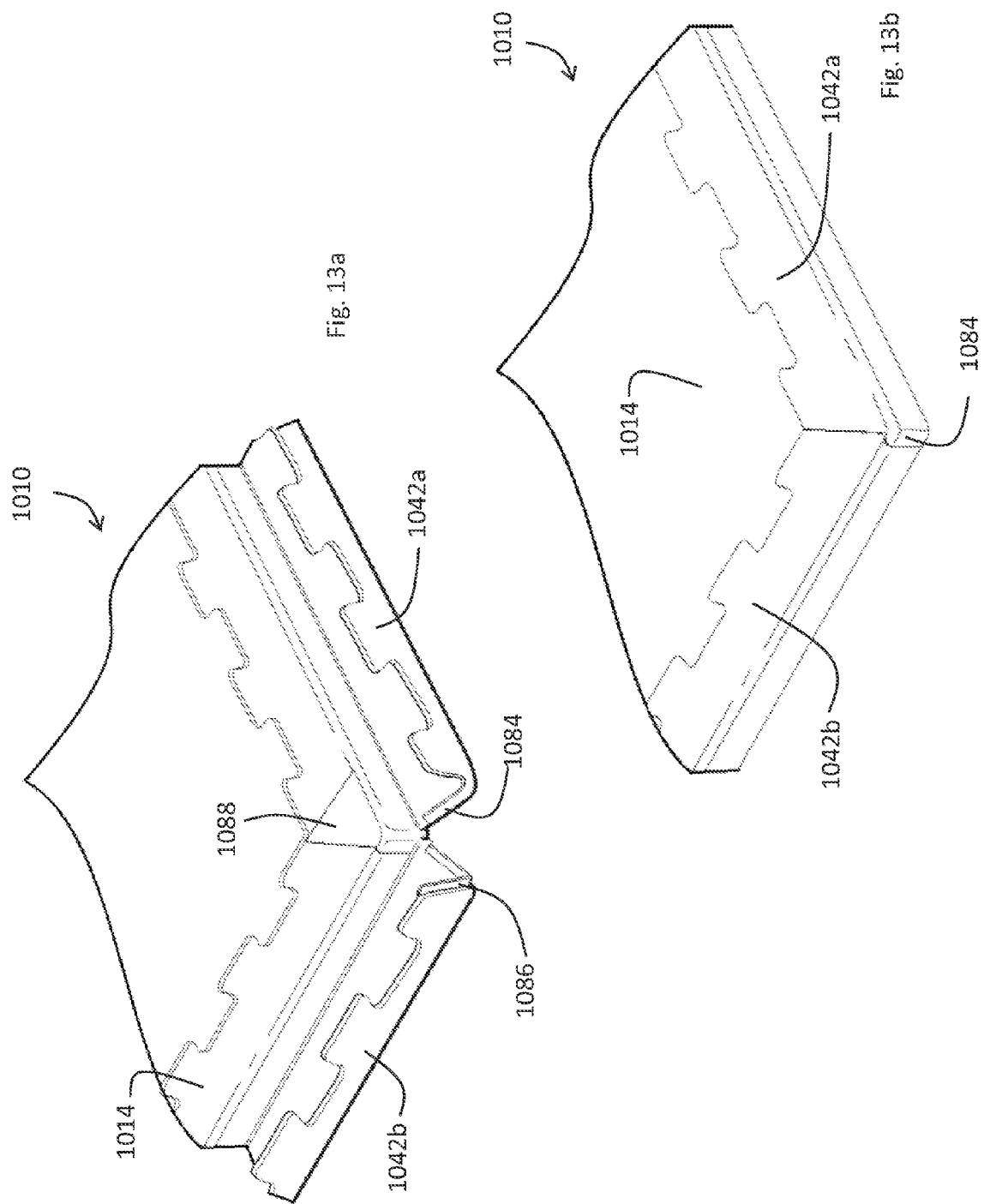

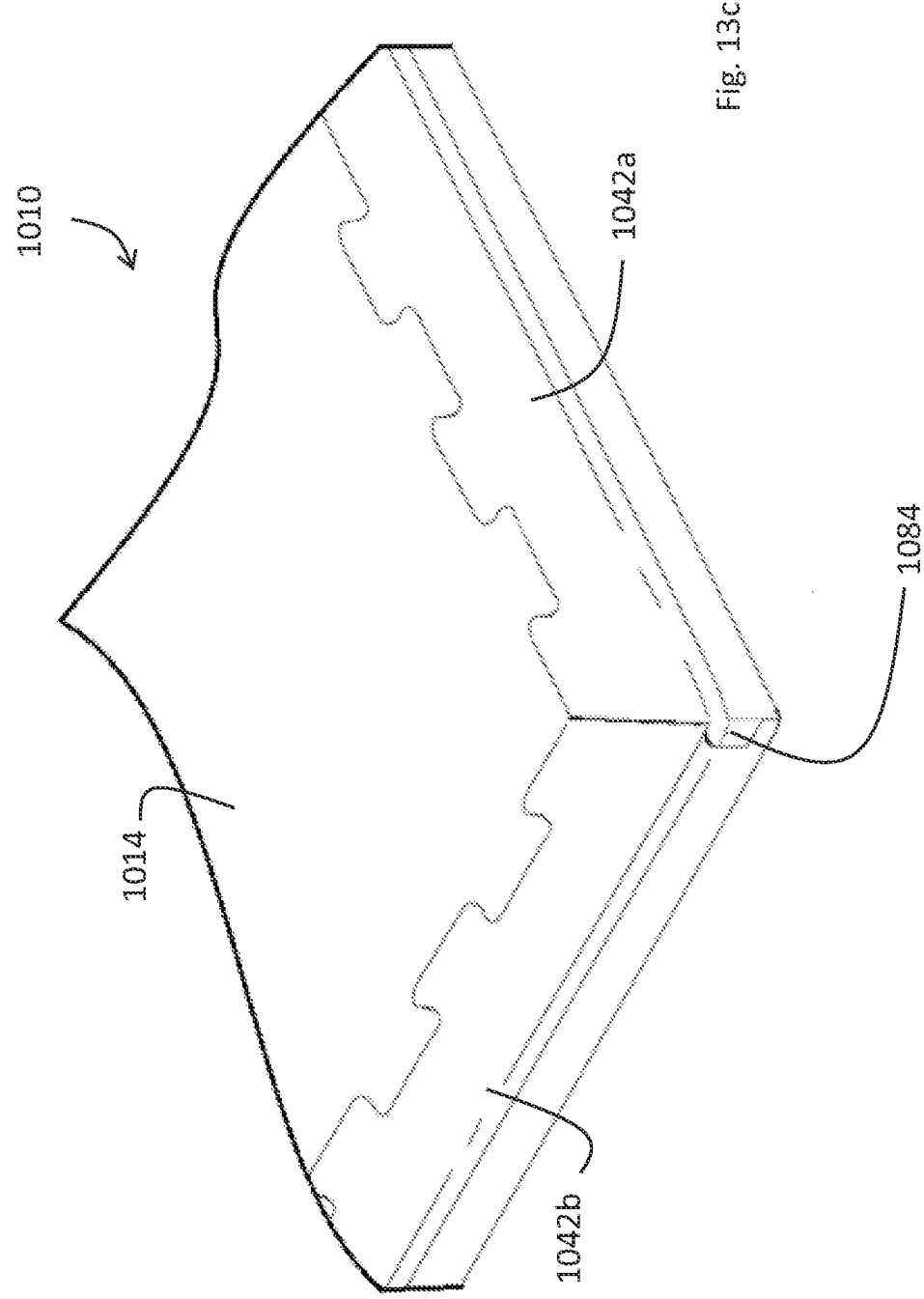

US 8,475,904 B2

HOLLOW ARTICLE WITH COVERING

CROSS-REFERENCE TO RELATED APPLICATIONS

This application claims benefit under 35 U.S.C. 119(e) to U.S. Provisional Patent Application No. 61/410,610, filed Nov. 5, 2010, entitled "Blow Molding Article and Method of Making Same," which is incorporated by reference herein in its entirety.

FIELD OF THE INVENTION

The present invention relates to a method of making hollow articles bonded with a covering, and their use, for example, as load floors in motor vehicles.

BACKGROUND OF THE INVENTION

Blow molded hollow articles with a covering can be made by a conventional, blow molding process by inserting a covering in a blow mold. For example, this technique can be made to made hollow articles such as carpeted, load floors. A carpeted load floor is formed by placing a carpet in the mold and then inflating a parison to form a hollow article with a bonded carpet on one side and along edges. The wrapping of the carpet along the edges is limited to the location of the parting line that is usually placed at the mid-point of the thickness of a part for ease of manufacturing. The part cannot be molded with a small radius for the upper surface edges. The carpet is thinned at the corners and edges of the upper surface. This thinning may lead to plastic bleed through or poor carpet appearance. The surplus carpet and plastic flash are trimmed along the parting line leading to a sharp edge. As outlined, a number of difficulties arise from this method.

Another conventional method of attaching a carpet to a plastic component is by means of an adhesive. An article is first molded and a carpet is pre-cut to the desired shape. The carpet is affixed to the plastic in a secondary operation. During this secondary operation the adhesive is placed on one or both surfaces to be bonded. The use of adhesive entails a significant additional material cost in manufacturing the part. Also, a period of time is required to bond the carpet to the plastic component adversely affecting productivity. The alignment and placement of carpet is difficult and not exact. The process requires substantial labour and time which makes this process less attractive for automotive manufacturing.

Improvements are required to the covering of a hollow article that meets appearance requirements specifically at the sidewalls of a part, reduces material consumption, reduces labour requirements, and improves productivity.

SUMMARY OF THE INVENTION

According to an aspect of an embodiment, provided is a hollow article including a first wall, a second wall and a plurality of edge walls interconnecting the first wall and second wall. A covering is bonded to the hollow article, wherein the covering is bonded to the first wall, and is dimensioned to partially wrap around the hollow article.

BRIEF DESCRIPTION OF THE DRAWINGS

The foregoing and other features and advantages of the invention will be apparent from the following description of the invention as illustrated in the accompanying drawings.

The accompanying drawings, which are incorporated herein and form a part of the specification, further serve to explain the principles of the invention and to enable a person skilled in the pertinent art to make and use the invention. The drawings are not to scale.

FIGS. 1a and 1b are side sectional view of a load floor according to a first embodiment of the invention.

FIGS. 3a and 3b are partial side sectional views of a load floor according to a second embodiment of the invention.

FIGS. 4a and 4b are side sectional views of a load floor according to a third embodiment of the invention.

FIGS. 5a and 5b are partial side sectional views of a load floor according to a forth embodiment of the invention.

FIGS. 6a and 6b are side sectional views of a load floor according to a fifth embodiment of the invention.

FIGS. 7a and 7b are partial side sectional views of a load floor according to a sixth embodiment of the invention.

FIGS. 8a and 8b are partial side sectional views of a load floor according to a seventh embodiment of the invention.

FIGS. 9a and 9b are partial side sectional views of a load floor according to an eighth embodiment of the invention.

FIG. 9c is a bottom perspective view of the load floor of FIGS. 9a and 9b.

FIGS. 10a to 10d are partial side sectional views the load floor of FIGS. 1a and 1b, illustrating the incorporating various forms of an internal support structure.

FIG. 12a is a top perspective view of a load floor showing the use of a molded edge on all four sides of the load floor structure.

FIG. 12b is a bottom perspective view of the load floor of FIG. 12a.

FIGS. 13a to 13c are bottom perspective views of a portion of a load floor detailing a corner feature provided on the molded edges.

DETAILED DESCRIPTION OF EMBODIMENTS OF THE PRESENT INVENTION

Figure 2:
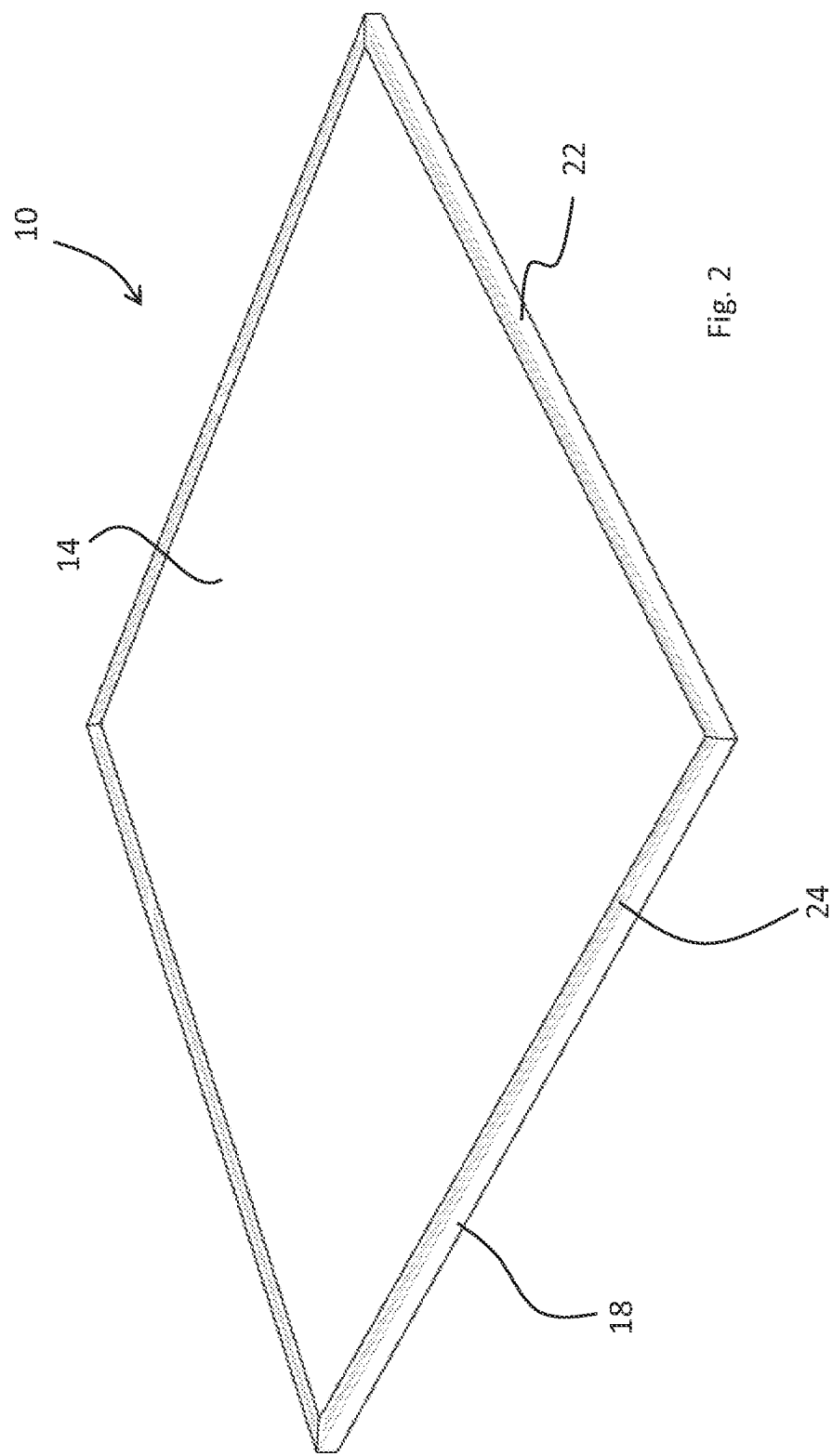
FIG. 2 is a bottom perspective view of the load floor of FIGS. 1a and 1b.

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the application of a covering on automotive load floors, the invention may also be used to apply covering on hollow articles in general, where it is deemed useful. Furthermore, there is no intention to be bound by any expressed or implied theory presented in the preceding technical field, background, brief summary or the following detailed description.

Turning now to FIGS. 1a and 1b, shown is a load floor 10 for a motor vehicle according to the present invention. Load floor 10 is generally a hollow article of a thermoplastic material and may be shaped/formed by way of blow molding. Load floor 10 includes a first wall 12, a second wall 14 and an edge wall 16 interconnecting the first and second walls 12, 14 along the sides of the load floor 10. A covering 18, for example a woven or non-woven carpet is bonded to first wall 12, and is dimensioned to partially wrap around load floor 10, for example as shown in FIG. 1b. As shown, covering 18 provides a first wall portion 20 to cover first wall 12, an edge-wall portion 22 to cover edge-wall 16, and a strip covering portion 24 to wrap around and partially cover a perimeter region of second wall 14.

To accommodate covering 18 on second wall 14, load floor 10 is provided with a recessed face 26 on at least a portion of the perimeter region of the second wall 14. In the embodiment shown, recessed face 26 terminates at wall 28. Recessed face 26 allows covering 18 to be flush with second wall 14 once covering 18, and in particular strip covering portion 24 is wrapped and fastened to second wall 14. Covering 18 may be fastened to load floor 10 a number of ways, including but not limited to adhesives. An exemplary load floor 10 is shown (perspective bottom view) in FIG. 2.

Turning now to FIGS. 3a and 3b, shown is a variation on load floor 10 where in this embodiment, load floor 110 is provided with a slot 136 formed on at least a portion of second wall 114 proximal the perimeter region. As load floor 110 is substantially similar to load floor 10, only differences between load floor 10 and 110 are discussed herein. As shown, slot 136 is generally defined by a pair of vertical walls 138 and an end-wall 140 formed on second wall 114. Covering 118 provides a first wall portion 120 to cover first wall 112, an edge wall portion 122 to cover edge wall 116 and a strip covering portion 124 to wrap around and partially cover a perimeter region of second wall 114, with the edge of covering 118 terminating in slot 136. In some embodiments, the edge of covering 118 may be pressed into slot 136, while in other embodiments, an adhesive may be used to secure the edge in slot 136. In other embodiments, covering 118 may be retained in slot 136 by way of press-fit using a secondary element, such as a flexible rod or tube-like structure. As such, slot 136 serves to provide a defined edge between covering 118 and second wall 114.

While the covering may be bonded directly to the load floor using suitable adhesives or alternate bonding means, in other embodiments, edge wrapping of the covering may be facilitated through the use of a hinged molded edge formed as part of the load floor structure. In general, the molded edge is configured to fasten in the closed position using interlocking members. Interlocking generally refers to mechanical bonding through friction, wedging or physical interference. Examples of load floor embodiments having a molded edge feature are detailed below.

Presented in FIGS. 4a and 4b is an alternate embodiment of a load floor 210 having a molded edge 242. Similar to the previous embodiment, load floor 210 provides a first wall 212, a second wall 214 and an edge wall 216 interconnecting the first and second walls 212, 214 along the sides of the load floor 210. Molded edge 242 is integrally connected to load floor 210 along a peripheral edge of the first wall 212 through living hinge 244. Molded edge 242 is designed to have a covering 218 bonded thereto, wrap around edge wall 216, and lock onto second wall 214, as shown for example in FIG. 4b. In some embodiments, molded edge 242 is provided with a second living hinge 246 permitting molded edge 242 to be further folded. As such, molded edge 242 is provided as a three-part structure having a first wall segment 248 immediately adjacent living hinge 244 to cover edge wall 216, a second wall segment 250 for covering a portion of second wall 214, and a third wall segment 252 configured as an interlock feature to be attached and/or locked into a receiving structure (e.g. slot) provided on second wall 214.

Third wall segment 252 is configured to be received in a slot 254 formed in second wall 214. Third wall segment 252 is provided with a protrusion 256 to assist in interlocking the hinged molded edge 242 upon folding into the closed and locked position. As shown, protrusion 256 is generally a barb-like structure, or is otherwise shaped to provide an interlocking feature to lock third wall segment 252 in slot 254. Slot 254 is generally shaped to correspond with the locking feature provided on third wall segment 252. In the embodiment shown, slot 254 is configured with an elastically deformable narrow entry 258, and an enlarged locking portion/cavity 260 to receive and retain in locking relationship protrusion 256. As specifically shown, narrow entry 258 is defined by walls 262a and 262e, and locking portion/cavity 260 is defined by walls 262b, 262c, 262d and 262e. Upon folding molded edge 242 at living hinges 244 and 246, third wall segment 252, and in particular barb-like protrusion 256 is pushed through narrow entry 258 of slot 254 into locking portion/cavity 260, thereby being fixedly interlocked therein. As such, a surprising benefit of this edgewall construction is an increased rigidity of the load floor by providing additional material and support at the perimeter of the article.

As indicated above, and detailed in FIGS. 4a and 4b, covering 218 is bonded to load floor 210, including molded edge 242. As such, on folding and locking molded edge 242 in position, covering 218 provides a first wall portion 220 to cover first wall 212, an edge-wall portion 222 bonded to molded edge 242 to effectively wrap around edge wall 216 and a strip covering portion 224 also bonded to molded edge 242 which effectively wraps around and partially covers a perimeter region of second wall 214.

To accommodate molded edge 210 and covering 218 bonded thereto, and in particular to maintain a generally flat outside surface on second wall 214, load floor 210 is provided with a recessed face 226. In the embodiment shown, recessed face 226 terminates at narrow opening 258. As best seen in FIG. 4b, recessed face 226 allows covering 218 to be flush with second wall 214 once molded edge 210 is wrapped and locked into position.

Turning now to FIGS. 5a and 5b, presented is a load floor 310 having a variation on the interlock feature detailed above with respect to load floor 210. Load floor 310 is substantially similar to load floor 210; thus, only the differences between load floor 210 and 310 are discussed herein. Similar to molded edge 242, molded edge 342 is integrally connected to load floor 310 through living hinge 344, and is divided into three general segments, namely first wall segment 348, second wall segment 350, and third wall segment 352. Also similar to molded edge 242, molded edge 342 is provided with a second living hinge 346 permitting molded edge 342 to be folded. Covering 318 is bonded to each of first wall 312, first wall segment 348, second wall segment 350 and third wall segment 352 as shown. Of primary difference relative to molded edge 242, third wall segment 352 is provided as an interlock feature having a shape that substantially matches that of recess 360. In the specific arrangement shown, the terminal end of third wall segment 352 is tapered, and fits within a correspondingly tapered recess 360 formed by walls 362c, 362d, and 362e. As such, on insertion of third wall segment 352 into slot 354, third wall segment 352 seats against at least a portion of walls 362c, 362d, and 362e. Also provided on third wall segment 352 is a protrusion 356 configured to lock against ridge 382, ridge 382 being provided as an extension of second wall 314, thereby keeping third wall segment 352 fixedly retained therein.

As will be appreciated, the molded edge integrally hinged to the load floor may take on a variety of configurations. Presented in FIGS. 6a and 6b is an alternate embodiment of a load floor 410 having an alternate molded edge configuration. As shown, load floor 410 provides a first wall 412, a second wall 414 and a shaped edge wall 416 for receiving molded edge 442. Molded edge 442 is integrally connected to load floor 410 through living hinge 444. Molded edge 442 is a two-part structure having a first wall segment 448 immediately adjacent living hinge 444 to cover shaped edge wall 416, and a second wall segment 450 for covering a portion of second wall 414. To lock molded edge 442 in the closed position, molded edge 442 is provided with an interlock protrusion 464 that correspondingly interlocks with a locking feature 466 provided on edge wall 416. Load floor 410 is also provided with a recessed face 426 on second wall 414. In the embodiment shown, recessed face 426 terminates at wall 428. Recessed face 426 allows covering 418 to be flush with second wall 414 once covering 418, and in particular molded edge 442 is wrapped and fastened to edge wall 416.

In the embodiment shown, a covering 418 is provided on first wall 412 and molded edge 442. On folding and locking molded edge 442 in position, covering 418 provides a first wall portion 420 to cover first wall 412, an edge-wall portion 422 bonded to molded edge 442 to effectively wrap around edge wall 416 and a strip covering portion 424 also bonded to molded edge 442 which effectively wraps around and presents as a cover of the perimeter region of second wall 414.

In the embodiment shown in FIGS. 6a and 6b, load floor 410 is further provided with a covering 472 on second wall 414. Covering 472 may be bonded in a post-mold processing step where covering 472 is bonded to second wall using an appropriate adhesive.

Turning now to FIGS. 7a and 7b, presented is a load floor 510 having a variation on the interlock feature detailed above with respect to load floor 410. Load floor 510 is substantially similar to load floor 410; thus, only the differences between load floor 510 and 410 are discussed herein. Similar to molded edge 442, molded edge 542 is integrally connected to load floor 510 through living hinge 544, and is divided into two general segments, namely first wall segment 548, and second wall segment 550. Covering 518 is bonded to each of first wall 512, first wall segment 548, and second wall segment 550 as shown. Of primary difference, molded edge 542 provides a modified protrusion 564 provided on first wall segment 548, that correspondingly interlocks with a locking feature 566 provided on edge wall 516. Molded edge 542 also includes one or more guide protrusions 580, for example as shown provided on second wall segment 550, to promote a secure lock of molded edge 542 with edge wall 516, and further to ensure proper fit/finish in the closed and locked position. Guide protrusions are received in corresponding recesses 578 provided on second wall 514. As such, on folding molded edge 542 over edge wall 516, modified protrusion 564 engages locking feature 566, and guide protrusions 580 engage recesses 578, so as to ensure a secure fixed connection therebetween.

Turning now to FIGS. 8a and 8b, presented is a load floor 610 having a variation on the interlock feature detailed above with respect to load floor 410. Load floor 610 is substantially similar to load floor 410; thus, only the differences between load floor 610 and 410 are discussed herein. Similar to molded edge 442, molded edge 642 is integrally connected to load floor 610 through living hinge 644, and is divided into two general segments, namely first wall segment 648, and second wall segment 650. Covering 618 is bonded to each of first wall 612, first wall segment 648, and second wall segment 650 as shown. Of primary difference, molded edge 642 provides a modified locking feature on second wall segment 650. As shown, molded edge 642 is provided with a plurality of sawtooth-like projections 664 that correspondingly interlock with receiving recesses 678 provided on second wall 614. On folding molded edge 642 over edge wall 616, sawtooth-like projections 664 engage recesses 678 to ensure a secure fixed connection therebetween.

Turning now to FIGS. 9a, 9b and 9c, presented is a load floor 710 having a variation on the interlock feature detailed above with respect to load floor 410. Load floor 710 is substantially similar to load floor 410; thus, only the differences between load floor 710 and 410 are discussed herein. Similar to molded edge 442, molded edge 742 is integrally connected to load floor 710 through living hinge 744, and is divided into two general segments, namely first wall segment 748, and second wall segment 750. Covering 718 is bonded to each of first wall 712, first wall segment 748, and second wall segment 750 as shown. Of primary difference, molded edge 742 provides a modified locking feature on second wall segment 750. As shown, molded edge 742 is provided with a plurality of projections 764 that like a puzzle piece correspondingly interlock with receiving recessed seat 778 provided on second wall 714 (see in particular FIG. 9c). The embodiment shown in the figures also excludes the recessed face, as recess seat 778 is dimensioned with a depth sufficient to permit a flush finished profile on the second wall surface. On folding molded edge 742 over edge wall 716, projections 764 engage and interlock with respective recessed seats 778 to ensure a secure fixed connection therebetween.

In combination with any of the embodiments described above, the load floor may additionally include one or more internal support structures, such as one or more internal ribs or slots formed in one or both first and second walls, the internal support structures generally having a pair of side walls extending towards the opposing wall internal surface. The pair of side walls of the ribs or slots may be separated, or positioned in adjacent relationship. The internal support structures may be in the form of pillars, for example as detailed in U.S. Appl. No. 13/150,854 filed Jun. 1, 2011, which is incorporated by reference herein in its entirety. In some embodiments, the internal support structures may be in the form of tack-offs, wherein they form a structural bonded link between first and second walls. In other embodiments, the internal support structures do not contact and/or bond with the opposing wall.

Turning now to FIGS. 10a through 10d, presented is a load floor 810 that incorporates at least one internal support structure 830. As load floor 810 is substantially similar to load floor 10, only differences between load floor 10 and 810 are discussed herein. Internal support structure 830 generally includes a pair of walls 832a/832b extending from one wall, towards an opposing wall. In the embodiment shown, internal support structure 830 extends from second wall 814 towards first wall 812. Having regard to the orientation shown, walls 832a/832b may be substantially vertical, or otherwise substantially perpendicular relative to the plane defined by one or both of first wall 812 and second wall 814. Where walls 832a/832b remain in spaced apart relationship, for example as shown in the embodiment of FIG. 10a, an intermediate segment 832c connects walls 832a/832b. Where walls 832a/832b are aligned in adjacent relationship, for example as shown in FIG. 10b, walls 832a/832b may be fused together.

While internal support structure 830 may extend but remain in spaced-apart relationship relative to the opposing wall, as shown for example in FIGS. 10a and 10b, internal support structure 830 may also be provided in the form of a tack-off. As a tack-off structure, internal support structure 830 extends as shown in FIGS. 10c and 10d, that is it extends sufficiently to bond to the inside surface of first wall 812, thereby creating a structural link between first wall 812 and second wall 814.

Figure 11:
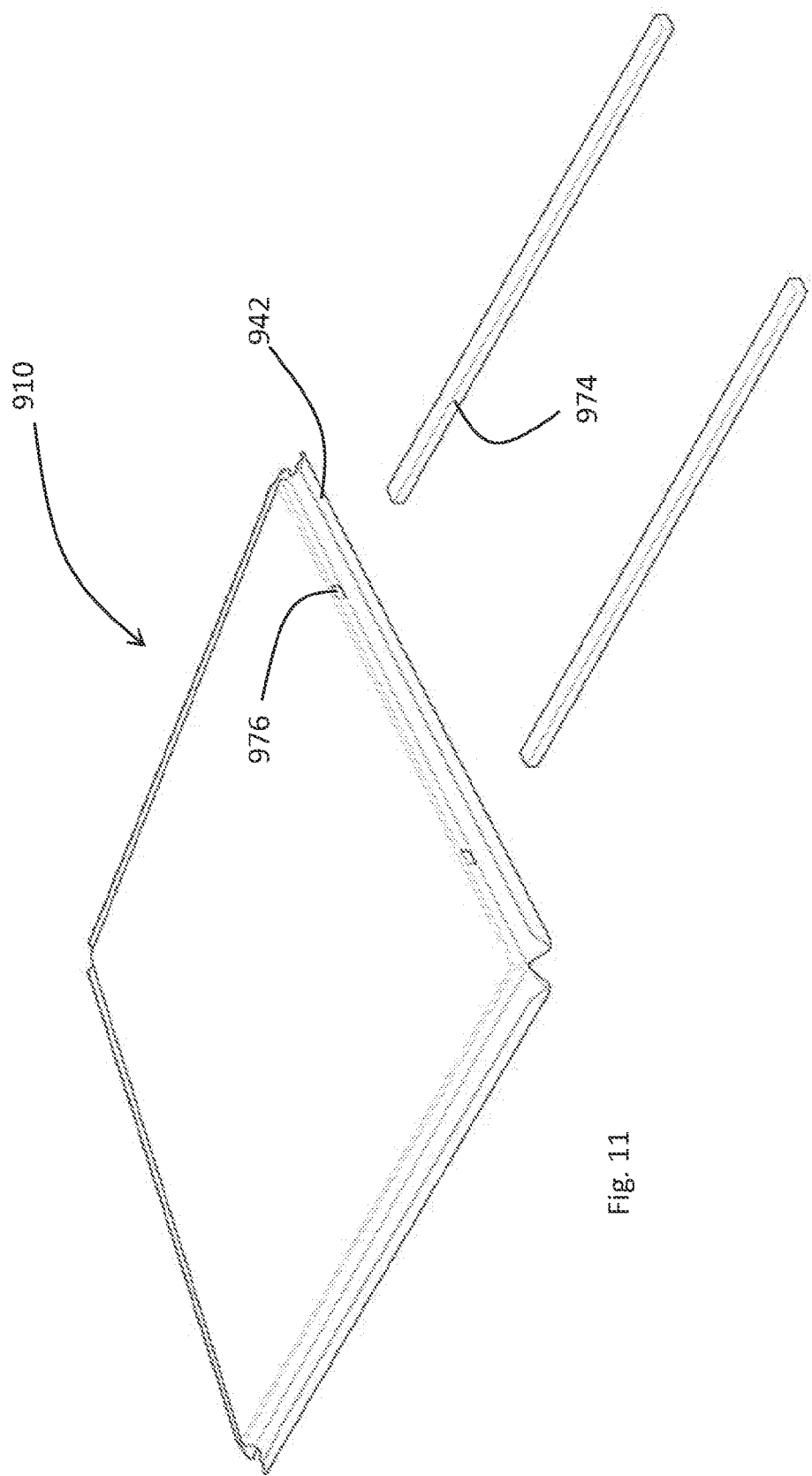
FIG. 11 is a bottom perspective view of a load floor incorporating an insertable structural element.

In combination with any of the embodiments presented above, the load floor may additionally have one or more insertable structural elements to further increase structural rigidity. For example, in the load floor 910 shown in FIG. 11, structural elements 974 may be inserted into respective apertures 976 formed in the hollow structure. In the embodiment shown, load floor 910 includes molded edge 942. With this arrangement, after structural element 974 is inserted into aperture 976, molded edge 942 is folded and locked into position, thereby hiding aperture 976, and locking structural element 974 within the load floor structure. Where a molded edge is not provided, suitable plugs and/or the covering may be used to hide/seal aperture 976, so as to retain structural element 974 in place. Suitable structural elements 374 may include rod or tube-like structures, or other reinforcement inserts incorporating polygonal structures (e.g. honeycomb structures).

While the embodiment represented in FIGS. 6a and 6b provide a second covering 472 on second wall 414, it will be appreciated that any of the embodiments described herein may be provided with a second covering. A second covering bonded to the second wall has the benefit of concealing surface features that may be present, such as any ribs, slots or other indentations arising from, for example internal support structures.

While the various embodiments detailed above have included a recessed face to permit a flush finish between the covering and the second wall outside surface, the use of a recessed face is merely optional. Any of the embodiments detailed above may be formed without the recessed face.

As will be appreciated, in any of the embodiments detailed above that include a molded edge, the molded edge may be provided on a single side. In other embodiments, the molded edge may be provided on multiple sides. In still further embodiments, the molded edge may be provided on all side surfaces, for example as shown in FIGS. 12a and 12b, where for the purposes of illustration, the molded edges correspond to the configuration detailed in FIGS. 4a and 4b, and wherein the load floor further includes slot-shaped internal support structures 230. In addition, where at least multiple molded edges are provided, in some embodiments, all molded edges will be of the same configuration. In other embodiments, there may be a combination of different molded edge configurations. The living hinge that attaches the molded edge to the load floor may be continuous along each side, or may be discontinuous where a plurality of living hinges serve to connect a molded edge to the load floor.

Where multiple molded edges are provided on a load floor, the molded edges may be configured to simply abut each other at the corners of the load floor. Alternatively, and as shown in FIGS. 13a and 13b, a corner feature may be provided on load floor 1010 to provide a finished corner. The corner feature includes a wrap-around edge 1084 provided on one molded edge 1042a, and a tongue 1086 provided on a second molded edge 1042b. On folding the molded edges 1042a, 1042b into position, wrap-around edge 1084 overlaps tongue 1086 along the corner as shown. On second wall 1014, tongue 1086 is overlapped by projection 1064. Wrap-around edge 1084 forms the corner of the load floor, as seen in FIG. 13b. To accommodate tongue 1086, second wall 1014 is provided is a recess 1088. While wrap-around edge 1084 is shown to span the whole edge, wrap-around edge 1084 may be configured to only partially span the edge, for example as shown in FIG. 13c.

While the various load floor embodiments detailed above may be manufactured using blow molding, other methodologies may be implemented. For example, the load floors detailed here may be manufactured using various twin sheet molding technologies, such as twin-sheet blow molding, or twin-sheet thermoforming. Injection molding may also be implemented. For example, the load floors may be injection molded as multiple separate pieces, and later bonded (e.g. welded) for form the final formed product. Other possible manufacturing processes include compression molding, and composite laminate molding. Various combinations of these processes may also be bonded in the manufacture of the load floors detailed here.

While the application of the covering to the load floor may be accomplished through the use of adhesives, the covering may also be bonded through insert-molding the covering during molding/forming of the load floor. In this way, the covering in integrally bonded to the thermoplastic material forming the load floor structure.

In any of the embodiments having a molded edge, in addition to the interlock features provided to secure the molded edge in the folded position, adhesives, bonding tapes, IR welding, inductive welding, conductive (hotplate) welding, and mechanical fasteners (e.g. rivets, push-in clips, staples, etc.) may be used to increase the strength and permanence of the attachment required. Additional strength and permanence of the attachment may be achieved through the use of stakes, provided for example on the second wall structure, that are deformed on closure of the molded edge. Where an additional fastener is used, the fastener may provide additional functionality to the load floor, for example in the form of a bumper, limiting stop, tether anchor or arm support.

In any of the embodiments described herein, additional components, for example wiring or electronics may be inserted into the hollow structure of the load floor, generally through apertures or access points provided on the edge wall. The apertures or access points may then be concealed through the application of the covering, and/or the molded edge where provided.

Suitable materials for manufacture of any of the load floors detailed above include, but are not limited to thermoplastic polymers such as polypropylene, polyethylene, Acrylonitrile Butadiene Styrene (ABS), Polycarbonate/Acrylonitrile Butadiene Styrene (PC/ABS), polyamide, polylactide (PLA) and Polyphenylene Sulfide (PPS). The thermoplastic may include inorganic filler components including, but not limited to glass, mica, calcium carbonate, and talc to meet strength and rigidity requirements. The thermoplastic may have organic filler including carbon and natural fiber to meet strength and rigidity requirements.

The covering bonded to any of the load floors detailed above may be a woven or non-woven carpet, cloth or fabric. The material of the covering may be a thermoplastic polypropylene, polyethylene, polyester, thermoplastic polyolefin (TPO), polyamide, polylactide (PLA), polyvinyl chloride (PVC) or thermoplastic elastomer (TPE). In another embodiment the material is a natural organic fiber including cotton, wool, hemp or flax. The material may be leather, or a suitable artificial leather product. The covering may be porous, or perforated, so as to facilitate venting if insert-blow molded.

While the technology described herein has been with respect to automotive load floors, this is merely exemplary. It will be appreciated that the technology described herein may be bonded to a wide range of hollow articles in both automotive and non-automotive applications. For example, the technology may find application in other automotive panels, such as side panels and seat-back panels.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A hollow article comprising:
a first wall;
a second wall;
an edge wall interconnecting said first wall and said second wall to form the hollow article;
at least one molded edge integrally connected to the hollow article along a peripheral edge of said first wall by way of a living hinge, wherein said molded edge is dimensioned to wrap around said edge wall and interlock in a closed position; and
a covering bonded to said first wall and said molded edge that is dimensioned to partially wraparound the hollow article.

2. The hollow article of claim 1, further comprising:
one or more insertable structural elements, said structural elements being inserted through an aperture provided in said edge wall.

3. The hollow article of claim 1, wherein said covering is woven or non-woven, and is provided in the form of any one of a carpet, cloth and fabric.

4. The hollow article of claim 1, wherein said covering is bonded to the hollow article using an adhesive.

5. The hollow article of claim 1, wherein said covering is bonded to the hollow article through insert molding said covering in place during molding of the hollow article.

6. The hollow article of claim 1, further comprising: a second covering bonded to said second wall.

7. The hollow article of claim 1, wherein multiple molded edges are provided and meet at a corner of the hollow article, the molded edges having a corner feature comprising a wrap-around edge provided on a first molded edge, and a tongue provided on a second molded edge, said wrap-around molded edge overlapping said tongue to provide a finished corner.

8. The hollow article of claim 1, wherein said molded edge is provided with a second living hinge defining a three part structure having a first wall segment for covering said edge wall, a second wall segment for covering a portion of said second wall, and a third wall segment configured as an interlock feature, said interlock feature cooperating with a receiving structure provided on said second wall to lock said molded edge in a folded position.

9. The hollow article of claim 8, wherein said interlock feature is a barb-like protrusion, and said receiving structure is shaped to receive said barb-like protrusion in a locked arrangement.

10. The hollow article of claim 1, wherein said molded edge has a two-part structure having a first wall segment for covering said edge wall, and a second wall segment for covering a portion of said second wall.

11. The hollow article of claim 10, wherein said molded edge further comprises an interlock protrusion for cooperation with a corresponding locking feature provided on at least one of said second wall and said edge wall.

12. The hollow article of claim 1, further comprising:
one or more internal support structures extending from at least one of the first wall, second wall and edge wall towards an opposing wall.

13. The hollow article of claim 12, wherein said internal support structure is provided in the form of a tack-off where said internal support structure extends and bonds to an inside surface of said opposing wall.

14. The hollow article of claim 12, wherein said internal support structure is comprised of a pair of side walls, said side walls being positioned in spaced-apart relationship.

15. The hollow article of claim 12, wherein said internal support structure is comprised of a pair of side walls, said side walls being positioned in adjacent relationship.

16. A hollow article comprising:
a first wall;
a second wall;
an edge wall interconnecting said first wall and said second wall to form the hollow article;
at least one molded edge connected to the hollow article, said molded edge being provided as a two-part structure with a first wall segment for covering said edge wall and a second wall segment for covering a portion of said second wall, said molded edge further comprising an interlock protrusion for cooperation with a corresponding locking feature provided on said edge wall so as to interlock in a closed position, wherein said interlock protrusion is located on said first wall segment, and said second wall segment comprises one or more guide protrusions for cooperation with recesses provided on said second wall; and
a covering bonded to said first wall and said molded edge that is dimensioned to partially wraparound the hollow article.

17. A hollow article comprising:
a first wall;
a second wall;
an edge wall interconnecting said first wall and said second wall to form the hollow article;
at least one molded edge connected to the hollow article, said molded edge being provided as a two-part structure with a first wall segment for covering said edge wall and a second wall segment for covering a portion of said second wall, said molded edge further comprising an interlock protrusion for cooperation with a corresponding locking feature provided on said second wall so as to interlock in a closed position, wherein said interlock protrusion is located on said second wall segment, and is provided in the form of a plurality of sawtooth-like projections for cooperation with said corresponding locking feature on said second wall.

* * * * *